Jan. 7, 1930. E. W. RIEMENSCHNEIDER 1,742,450
CLAMP PLATE
Filed Feb. 24, 1928
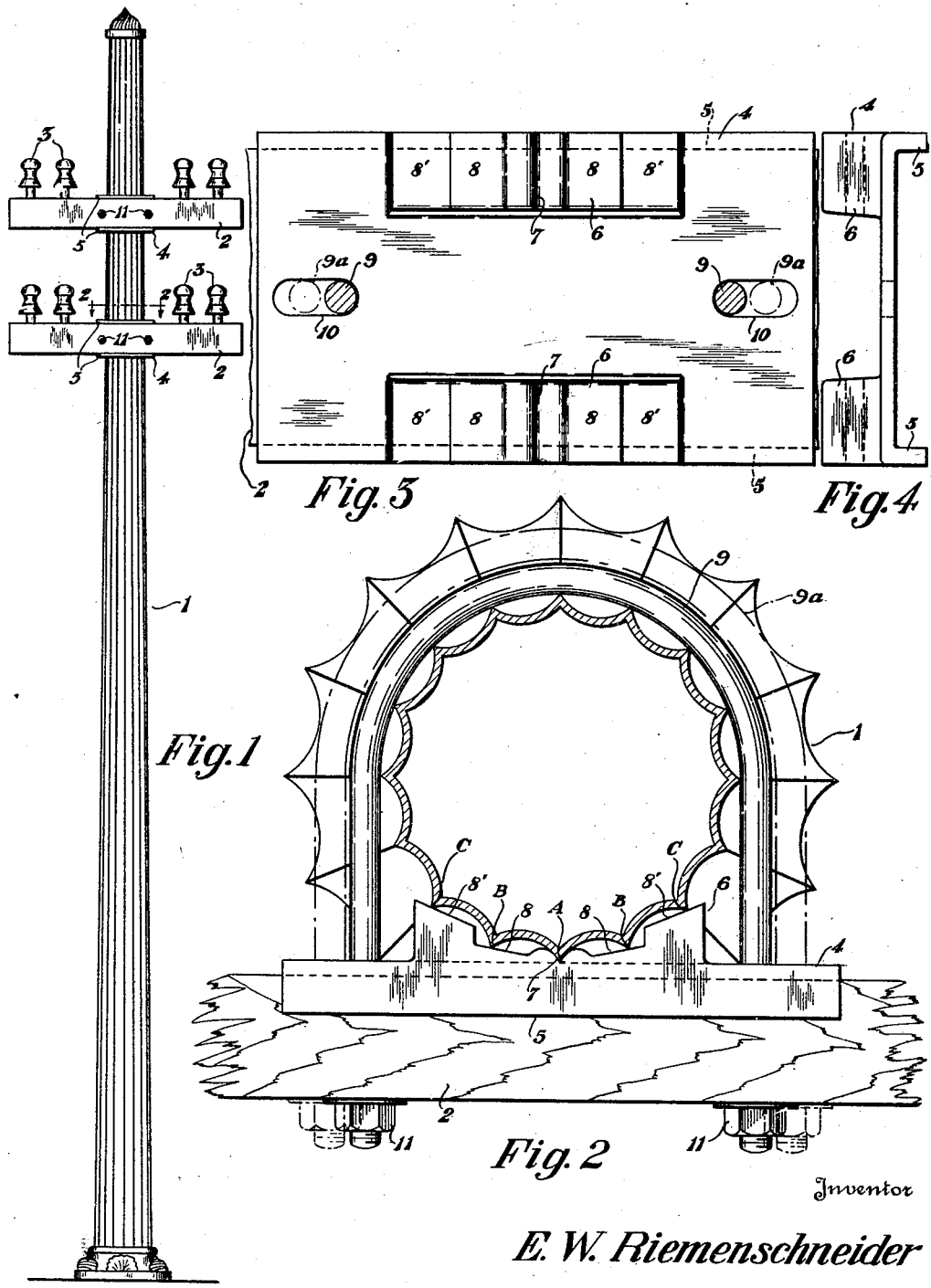

Patented Jan. 7, 1930

1,742,450

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

CLAMP PLATE

Application filed February 24, 1928. Serial No. 256,550.

The invention relates to poles provided with cross arms such as are used for supporting transmission wires for telegraph, telephone and similar purposes, and more particularly to a clamp plate for connecting the cross arms upon fluted poles.

The object of the improvement is to provide a clamp plate having a V-shaped groove adapted to receive one fillet of the fluted pole and having an angular face upon each side of said groove adapted to contact with the adjacent fillets of the pole, a U-shaped bolt being arranged to engirdle the pole, the ends thereof being arranged to be located through the clamp plate and through the cross arm to be supported thereby and to be attached thereto as by nuts or the like.

An embodiment of the invention is illustrated in the accompanying drawing, in which—

Figure 1 is an elevation of a fluted pole provided with cross arms attached thereto by the improved clamp plate;

Fig. 2, an enlarged sectional view taken substantially on the line 2—2, Fig. 1;

Fig. 3, an elevation of the inner face of the clamp plate; and

Fig. 4, an end elevation of the same.

Similar numerals refer to similar parts throughout the drawing.

The improved clamp plate is adapted to be applied to fluted poles as indicated generally at 1 which may be of tapered tubular construction as shown in the drawing.

Cross arms 2, which may be of wood, are adapted to be firmly attached to the pole at any desired point along the length of the pole, for the purpose of carrying insulators 3 or the like to which wires may be attached.

One of the clamp plates, as indicated generally at 4, is provided for attaching each cross arm to the pole at any desired point along the length of the pole. This clamp plate may be of channel cross sectional shape having the upper and lower outturned flanges 5 between which the cross arm 2 may be received.

The inner face of the clamp plate may be provided near its upper and lower edges with the projecting portions 6, each of which has the centrally located V-shaped groove 7 and the oppositely disposed plane faces 8 and 8' in angular relation with each other.

In attaching the cross arm to the fluted pole, the inner face of the clamp plate is positioned toward the pole as best shown in Fig. 2, the fillet of one flute only, as shown at A, being received in the single V-shaped groove 7 while the fillets of the flutes at either side thereof, as indicated at B, contact with the angular faces 8, while if additional faces 8' are provided, the next adjacent fillets contact therewith as indicated at C.

A U-shaped bolt 9 may engirdle the pole for drawing the clamp plate tightly against the same. The legs of this bolt are extended through the elongated openings or slots 10 in the plate and through the cross arm, nuts 11 being applied to the threaded extremities of the bolt for drawing the parts tightly together and clamping the arm and clamp plate upon the pole at the desired point.

By providing elongated openings 10 in the clamp plate, it will be seen that the same clamp plate may be used at different points upon the tapered pole or upon poles of different diameters, permitting the use of U-bolts of different sizes to conform to the diameter of the pole, as indicated in broken lines at $9^a$ in Fig. 2.

It will be seen that when the arm is attached to the pole by means of this clamp plate, the V-shaped grooves 7 engaging the fillet 8 prevent movement of the arm in a vertical plane and the three point contact of the clamp with the fillets A, B—B and C—C prevents movement of the arm in a horizontal plane, thus holding the arm rigidly in position upon the pole.

I claim:

1. A clamp plate for a fluted pole, a pair of plane faces in angular relation with each other upon the plate for contact with the outer fillets of two flutes of the pole, and a U-bolt connected with the plate adapted to engirdle the pole and to clamp the plate against the pole, whereby the faces will maintain contact with said outer fillets for a considerable length of the pole.

2. A clamp plate for a fluted pole, including a single vertical groove for engagement with the fillet of one flute only of the pole, and a U-bolt adapted to engirdle the pole and to clamp the plate against the pole, the plate having elongated openings to receive the legs of the U-bolt whereby the plate may be attached to different diameters of poles.

3. A clamp plate for a fluted pole, including a single vertical groove for engagement with the fillet of one flute only of the pole, plane faces in angular relation with each other upon the plate for contact with adjacent fillets, and a U-bolt adapted to engirdle the pole and to clamp the plate against the pole, the plate having elongated openings to receive the legs of the U-bolt whereby the plate may be attached to different diameters of poles.

4. A clamp plate for a fluted pole, a pair of plane faces in angular relation with each other upon the plate for contact with fillets of two flutes of the pole, and a U-bolt connected with the plate adapted to engirdle the pole and to clamp the plate against the pole, the plate having elongated openings to receive the legs of the U-bolt whereby the plate may be attached to different diameters of poles.

5. A clamp plate for a fluted pole including a single vertical groove for engagement with the fillet of one flute only of the pole, plane faces in angular relation with each other upon the plate for contact with other fillets, and means for clamping the plate against the pole.

6. A clamp plate for a fluted pole, including a single vertical groove for engagement with the fillet of one flute only of the pole, plane faces in angular relation with each other upon the plate for contact with adjacent fillets, and a U-bolt adapted to engirdle the pole and to clamp the plate against the pole, the plate being of angular cross sectional shape to receive a cross arm and the like.

In testimony that I claim the above, I have hereunto subscribed my name.

EDMUND W. RIEMENSCHNEIDER.